(12) United States Patent
Chartier et al.

(10) Patent No.: US 7,337,393 B2
(45) Date of Patent: Feb. 26, 2008

(54) METHODS AND SYSTEMS FOR PROVIDING AN EDITABLE VISUAL FORMATTING MODEL

(75) Inventors: Daniel P. Chartier, Redmond, WA (US); Benjamin C. Constable, Redmond, WA (US); Sam Spencer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 24 days.

(21) Appl. No.: 11/222,715

(22) Filed: Sep. 9, 2005

(65) Prior Publication Data

US 2007/0061715 A1    Mar. 15, 2007

(51) Int. Cl.
G06F 15/00 (2006.01)
(52) U.S. Cl. .............. 715/513; 715/514; 715/518; 715/520
(58) Field of Classification Search .............. None
See application file for complete search history.

(56) References Cited

U.S. PATENT DOCUMENTS

| 5,860,073 | A | 1/1999 | Ferrel et al. | |
|---|---|---|---|---|
| 7,051,276 | B1* | 5/2006 | Mogilevsky et al. | 715/517 |
| 7,111,234 | B2* | 9/2006 | Peck et al. | 715/517 |
| 7,131,065 | B1* | 10/2006 | Kane | 715/517 |
| 2002/0188636 | A1 | 12/2002 | Peck et al. | |
| 2004/0187080 | A1 | 9/2004 | Brooke et al. | |
| 2004/0205588 | A1* | 10/2004 | Purvis et al. | 715/513 |
| 2004/0255244 | A1* | 12/2004 | Filner et al. | 715/517 |
| 2005/0251742 | A1* | 11/2005 | Mogilevsky et al. | 715/521 |
| 2006/0212803 | A1* | 9/2006 | Arokiaswamy | 715/520 |
| 2006/0218490 | A1* | 9/2006 | Fink | 715/517 |
| 2006/0259859 | A1* | 11/2006 | Ivarsoy et al. | 715/520 |

FOREIGN PATENT DOCUMENTS

EP    1 100 269 A1    5/2001

OTHER PUBLICATIONS

Author: Joseph W. Lowery, Title: "Dreamweaver MX 2004 Bible", Date: 2004, Publisher: Wiley Publishing, Inc., pp. 415-427, 436-438.*
Author: Andy Budd, Title: Andy Budd on CSS Margin Collapsing, URL: "http://www.handcoding.com/archives/2004/02/14/andy-budd-on-css-margin-collapsing/", Date: Feb. 14, 2004.*
Author: Minz Meyer, Title: "CSS—Auto-height and margin-collapsing", URL: "http://www.researchkitchen.de/blog/archives/css-autoheight-and-margincollapsing.php", Date: Jul. 28, 2004.*
Co-pending U.S. Appl. No. 11/223,397, entitled "Methods and Systems for Providing Direct Style Sheet Editing," filed Sep. 9, 2005.
PCT Search Report dated Feb. 22, 2007 cited in Application No. PCT/US2006/034992.

* cited by examiner

*Primary Examiner*—Mark Zimmerman
*Assistant Examiner*—David Chu
(74) *Attorney, Agent, or Firm*—Merchant & Gould

(57) ABSTRACT

Systems and methods are disclosed for providing an editable visual formatting model. The disclosed systems and methods may include providing visual formatting properties. The visual formatting properties may comprise an outer-most polygon corresponding to a container of a selected element, a middle polygon corresponding to a margin of the selected element, and an inner-most polygon corresponding to a padding of the selected element. Furthermore, the disclosed systems and methods may include providing interactive handles configured to provide design view editing of the visual formatting properties.

20 Claims, 4 Drawing Sheets

METHODS AND SYSTEMS FOR PROVIDING AN EDITABLE VISUAL FORMATTING MODEL

RELATED APPLICATION

Related U. S. patent application Ser. No. 11/223,397, filed on even date herewith in the name of Daniel P. Chartier et al. and entitled "METHODS AND SYSTEMS FOR PROVIDING DIRECT STYLE SHEET EDITING," assigned to the assignee of the present application, is hereby incorporated by reference.

BACKGROUND

A style sheet is a master page layout used in document creation systems such as word processing, desktop publishing, and the Internet. The style sheet is a file that is used to store margins, tabs, fonts, headers, footers, and other layout settings for a particular category of document. When a style sheet is selected, its format settings are applied to all the documents created under it, saving the page designer or programmer from redefining the same settings over and over again for each page.

Cascading style sheets (CSS) defines a visual formatting model used for laying out, for example, extensible markup language (XML) or hypertext markup language (HTML) elements. In this model, every element is laid out using a visual "box model." As shown in FIG. 4, a box model 400 includes a plurality of boxed elements comprising a margin 405, a border 410, a padding 415, and a content 420 that together allow the flexible layout of the boxed elements. Moreover, every edge for each boxed element in box model 400 is given a CSS property (e.g. "margin-left" or "padding-top".) For example, using box model 400, a paragraph can be indented by giving it a left margin.

Another aspect of the visual formatting model are the CSS position schemes that define a set of positioning modes that use the offsets "top", "right", "bottom", "left", "width" and "height" to position boxed elements on a page. Using one of the positioning schemes, such as "absolute", a boxed element can be position at the very top-left of the positioning container using "top: 0; left: 0;", for example.

In some situations, editing box model properties is limited to manual code editing or form user interface (UI.) Thus, the conventional strategy is to directly edit the associated CSS box model properties. This often causes problems because the conventional strategy requires a manual non-visual process. For example, the conventional strategy forces designers to tediously edit the page layout in one UI and then switch to a preview mode to observe the edit's effect.

In view of the foregoing, there is a need for methods and systems for providing an editable visual formatting model more optimally. Furthermore, there is a need for providing an editable visual formatting model using, for example, a design view representation and editing experience of the visual formatting model properties.

SUMMARY

Consistent with embodiments of the present invention, systems and methods are disclosed for providing an editable visual formatting model.

In accordance with one embodiment, a method for providing editable visual formatting comprises providing visual formatting properties, the visual formatting properties comprising an outer-most polygon corresponding to a container of a selected element, a middle polygon corresponding to a margin of the selected element, and an inner-most polygon corresponding to a padding of the selected element, and providing interactive handles configured to provide design view editing of the visual formatting properties.

According to another embodiment, a system for providing editable visual formatting comprises a memory storage for maintaining a database and a processing unit coupled to the memory storage, wherein the processing unit is operative to provide visual formatting properties, the visual formatting properties comprising an outer-most polygon corresponding to a container of a selected element, a middle polygon corresponding to a margin of the selected element, and an inner-most polygon corresponding to a padding of the selected element, and provide interactive handles configured to provide design view editing of the visual formatting properties.

In accordance with yet another embodiment, a computer-readable medium which stores a set of instructions which when executed performs a method for providing editable visual formatting, the method executed by the set of instructions comprising providing visual formatting properties, the visual formatting properties comprising, an outer-most polygon corresponding to a container of a selected element, a middle polygon corresponding to a margin of the selected element, and an inner-most polygon corresponding to a padding of the selected element, and providing interactive handles configured to provide design view editing of the visual formatting properties.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
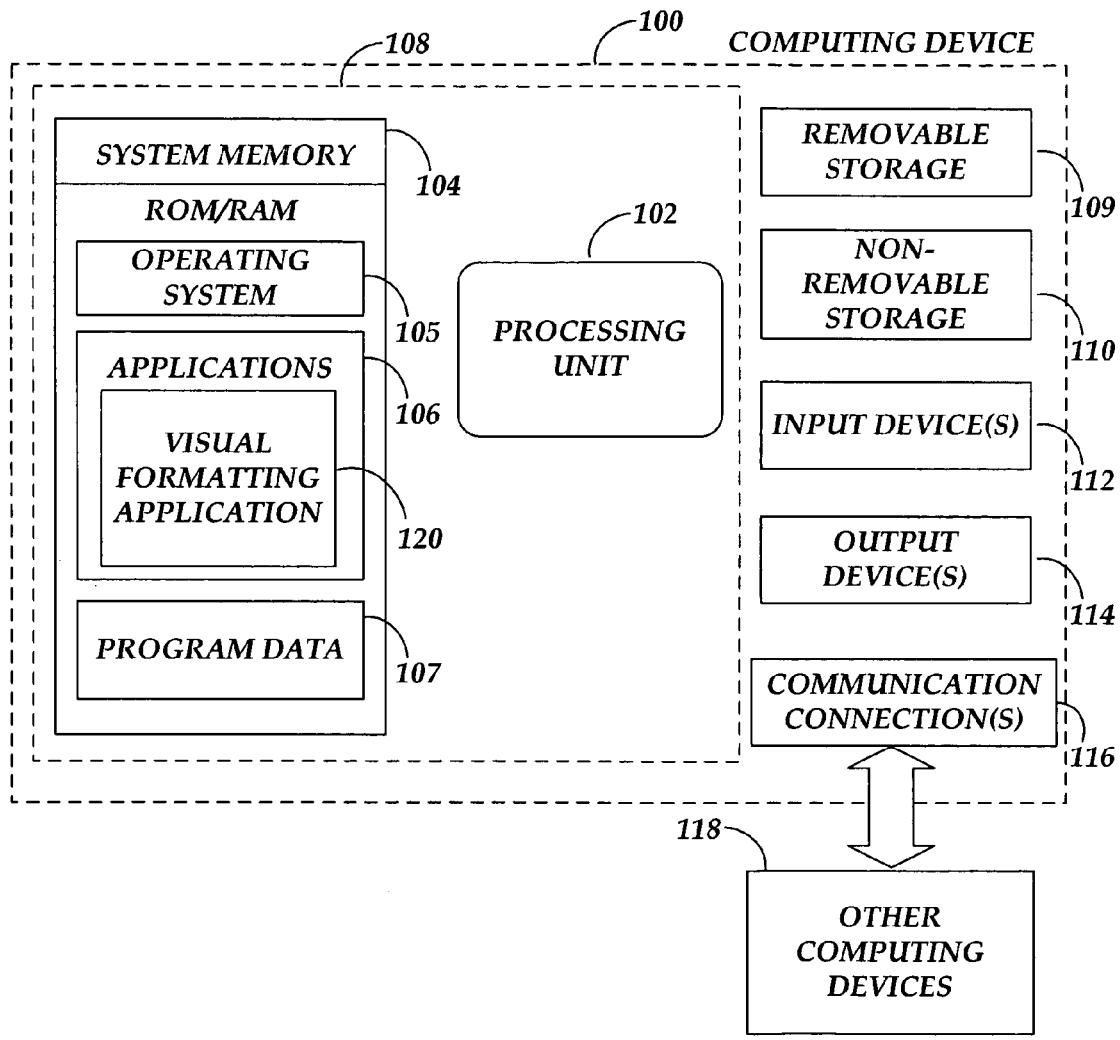
FIG. 1 is a block diagram of an exemplary system including a computing device consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention provide an editable visual formatting model. Consistent with embodiments of the present invention, a visual formatting model in a "what you see is what you get" (WYS/WYG) design view environment is provided. The visual formatting model consistent with embodiments of the invention may use CSS, though the invention is not limited to CSS and other formatting models may be used. WYSIWYG, for example, refers to displaying text and graphics on a screen in the same way the text and graphics print. To have WYS/WYG text, there may be an equivalent screen font for each printer font used.

Figure 2:
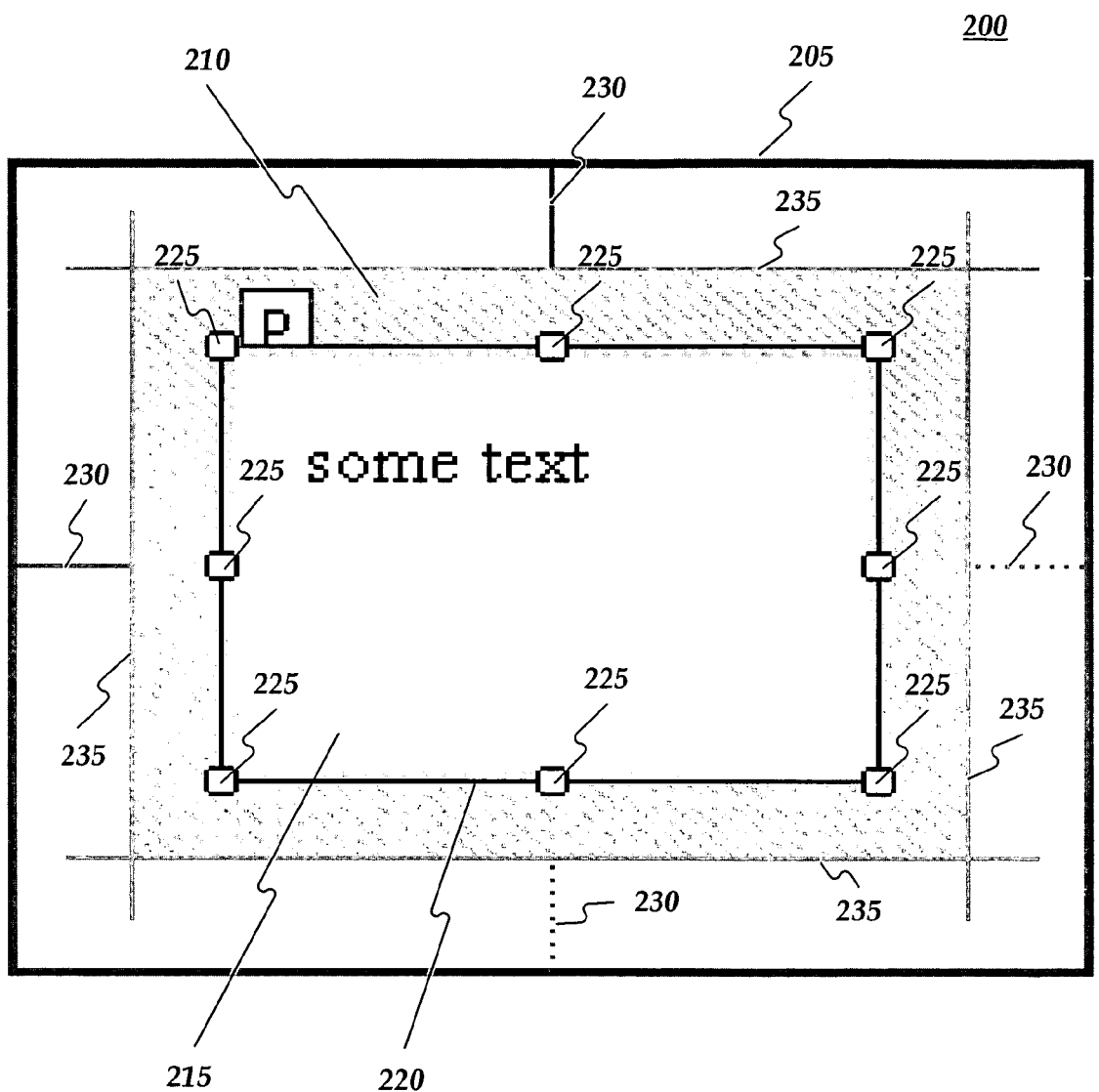
FIG. 2 is a diagram illustrating a visualization model design view representation consistent with an embodiment of the present invention.

FIG. 2 shows a visualization model design view representation 200 consistent with embodiments of the present invention. Design view representation 200 comprises many visualizations and tools including, for example: i) visual formatting properties whose primary purpose may be to depict, for example, CSS visual formatting properties that are ordinarily not present in a WYS/WYG environment and ii) interactive handles that may allow CSS visual formatting properties design view editing.

The visual formatting properties may include, for example, an outer-most rectangle 205 that may represent a selected element's CSS positioning container. Furthermore, a middle rectangle 210 may represent the selected element's CSS margin. Moreover, an inner-most rectangle 215 may represent the selected element's CSS padding. The aforementioned are exemplary and other visual formatting properties may be used.

The aforementioned interactive handles may include outer lines 230, connecting the positioning container (outer-most rectangle 205) to the margin (middle rectangle 210) that represent the top, right, bottom, and left CSS offsets. In addition, outer lines 230 rendered length may directly correspond to the offset's length. Likewise, lines bordering the margin visualization 235 may also comprise resize handles for the margin-top, margin-right, margin-bottom, and margin-left CSS properties. A middle border 220 may select the element. Handles 225 on middle border 220 may resize the width and height CSS properties. Clicking on any of the interactive handles, for example, may toggle the interactive handles property on or off. The aforementioned interactive handles are exemplary and others may be used.

Consistent with embodiments of the present invention, there are many advantages to the visual formatting model in a WYS/WYG design view environment. First, box model properties design view editing may be a direct and/or "live" experience as opposed to the conventional multi-step going from code to design process. Furthermore, there may be value in seeing the final calculated box model properties and how they interact with other elements in layout. One example may comprise the CSS margin collapsing rule. According to this rule, two adjacent vertical margins may be combined rather than added. In other words, margins (no non-empty content, padding or border areas or clearances separate them) of two or more boxes (which may be next to one another or nested) may combine to form a single margin. This rule's effect may be observed in the design view visualization consistent with embodiments of the invention. In contrast, this rule's effect is difficult to "calculate" in the designers mind when looking at mere code using conventional processes. The CSS margin collapsing rule is exemplary, and other rules, CSS or otherwise, may be implemented by embodiments of the present invention.

Furthermore, embodiments of the present invention may provide margin and padding visualizations. These margin and padding visualizations may provide design time feedback on the size and location of the CSS margin and padding properties. Furthermore, embodiments of the present invention may provide margin and padding editing handles. Vertical extensions on these editing handles may provide modeless resizing of CSS margin and padding properties. Moreover, embodiments of the present invention may provide margin and padding view. This padding view may reveal the margin and padding of the entire document that may allow users to see how margins interact in the document flow. In addition, embodiments of the present invention may provide positioning tools. These positioning tools may include the CSS positioning container box that shows the positioning container of the currently selection element. Also, these positioning tools may include offset lines that allow design view toggling of CSS offsets and feedback on which offsets are active and the magnitude them.

An embodiment consistent with the invention may comprise a system for providing editable visual formatting. The system may comprise a memory storage for maintaining a database and a processing unit coupled to the memory storage. The processing unit may be operative to provide visual formatting properties. The visual formatting properties may comprise an outer-most polygon corresponding to a container of a selected element, a middle polygon corresponding to a margin of the selected element, and an inner-most polygon corresponding to a padding of the selected element. Furthermore, the processing unit may be operative to provide interactive handles configured to provide design view editing of the visual formatting properties.

Consistent with an embodiment of the present invention, the aforementioned memory, processing unit, and other components may be implemented in a computing device, such as an exemplary computing device 100 of FIG. 1. Any suitable combination of hardware, software, and/or firmware may be used to implement the memory, processing unit, or other components. By way of example, the memory, processing unit, or other components may be implemented with any of computing device 100 or any of other computing devices 118, in combination with computing device 100. The aforementioned system, device, and processors are exemplary and other systems, devices, and processors may comprise the aforementioned memory, processing unit, or other components, consistent with embodiments of the present invention.

Generally, program modules may include routines, programs, components, data structures, and other types of structures that perform particular tasks or implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system consistent with an embodiment of the invention may include a computing device, such as computing device 100. In a basic configuration, computing device 100 may include at least one processing unit 102 and a system memory 104. Depending on the configuration and type of computing device, system memory 104 may be volatile (such as RAM), non-volatile (such as ROM, flash memory, etc.) or some combination. System memory 104 may include an operating system 105, one or more applications 106, and may include a program data 107. In one embodiment, applications 106 may include a visual formatting application 120. However, embodiments of the invention may be practiced in conjunction with a graphics library, an operating system, or any application program and is not limited to any particular application or system. This basic configuration is illustrated in FIG. 1 by those components within a dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by a removable storage 109 and a non-removable storage 110. Computer storage media may include volatile and nonvolatile, removable and non-removable media implemented in any method or technology for storage of information, such as computer readable instructions, data structures, program modules, or other data. System memory 104, removable storage 109, and non-removable storage 110 are all examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. The aforementioned devices are exemplary and others may be used.

Computing device 100 may also contain a communication connection 116 that may allow device 100 to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein may include both storage media and communication media.

A number of program modules and data files may be stored in system memory 104 of computing device 100, including an operating system 105 suitable for controlling the operation of a networked personal computer, such as the WINDOWS operating systems from MICROSOFT CORPORATION of Redmond, Wash. System memory 104 may also store one or more program modules, such as visual formatting application 120, and others described below. While executing on processing unit 102, visual formatting application 120 may perform processes including, for example, one or more of the stages of the methods described below. The aforementioned process is exemplary, and processing unit 102 may perform other processes. Other applications 106 that may be used in accordance with embodiments of the present invention may include electronic mail and contacts applications, word processing applications, spreadsheet applications, database applications, slide presentation applications, drawing or computer-aided application programs, etc.

Figure 3:
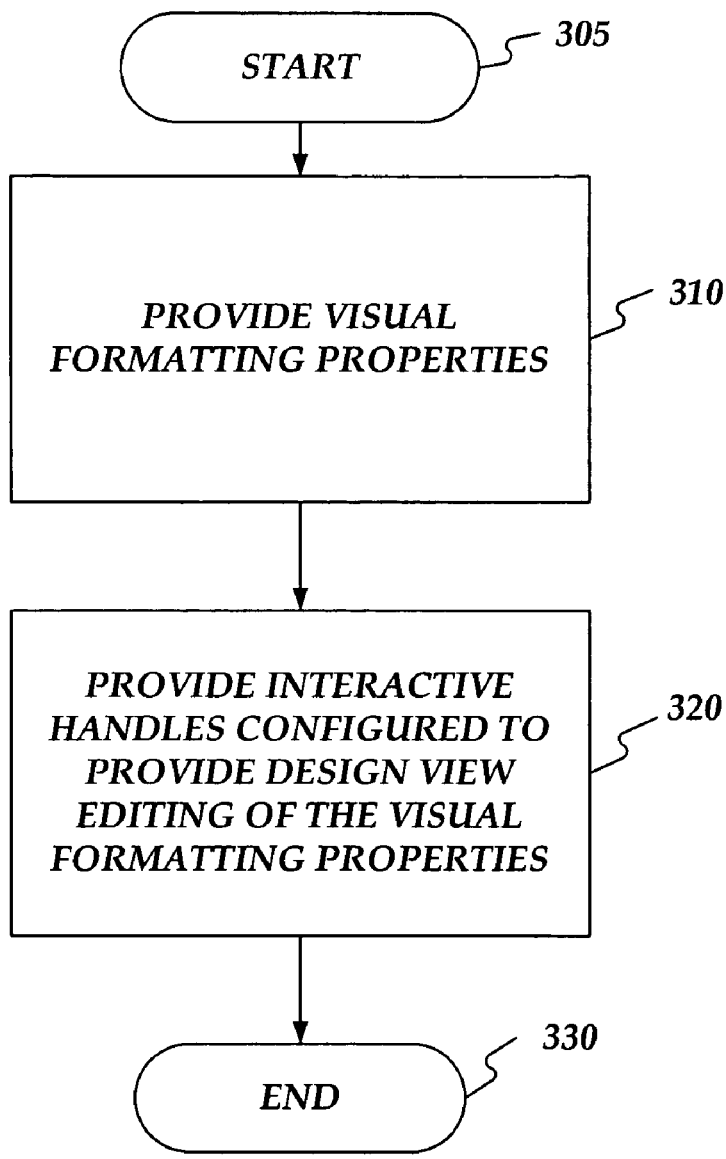
FIG. 3 is a flow chart of an exemplary method for providing editable visual formatting consistent with an embodiment of the present invention.
Figure 4:
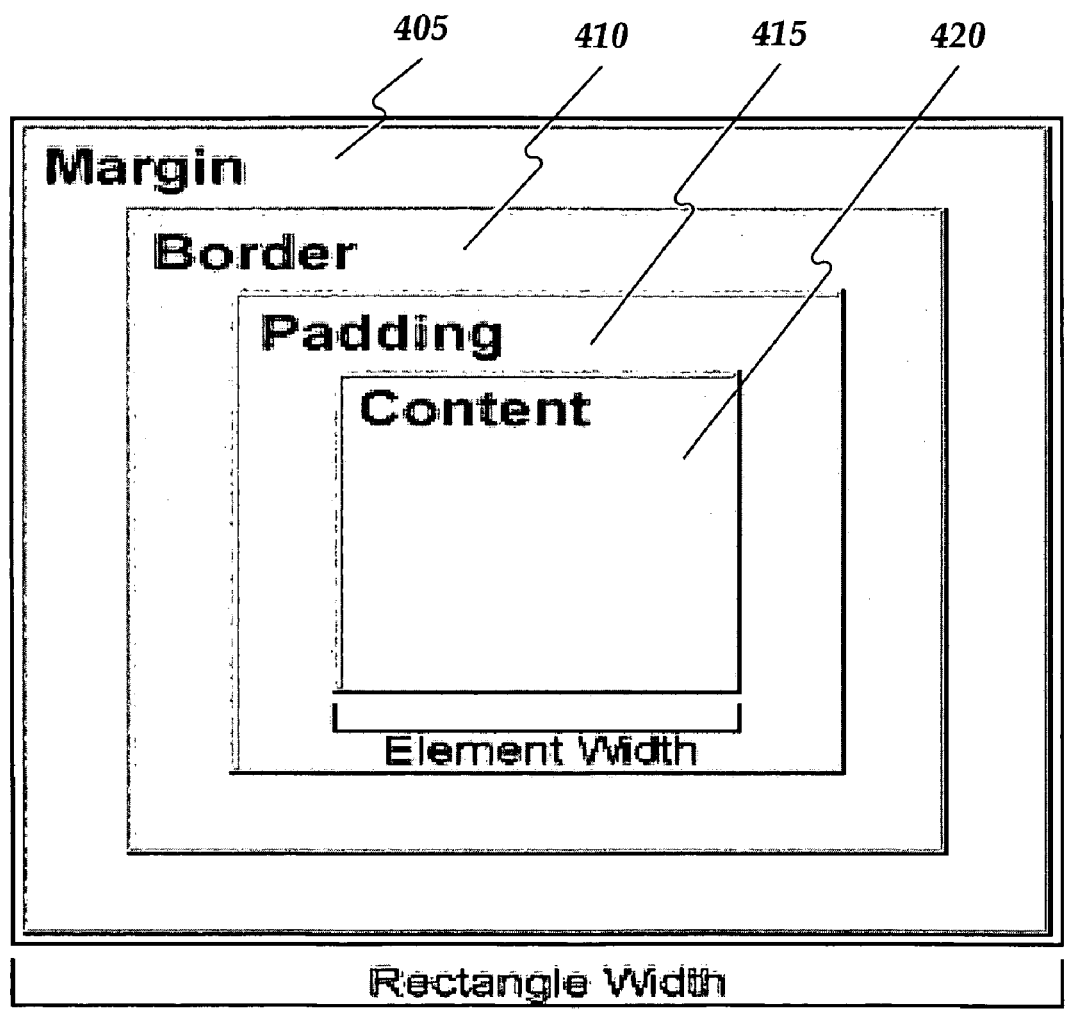
FIG. 4 is a diagram illustrating a box model.

FIG. 3 is a flow chart setting forth the general stages involved in an exemplary method 300 consistent with the invention for providing editable visual formatting using computing device 100 of FIG. 1. Exemplary ways to implement the stages of exemplary method 300 will be described in greater detail below. Exemplary method 300 may begin at starting block 305 and proceed to stage 310 where computing device 100 may provide visual formatting properties. For example, visual formatting application 120 may cause computing device 100 to display on one of output devices 114 the following visual formatting properties. As shown in FIG. 2, the visual formatting properties may include, for example, the outer-most rectangle 205 that may represent a selected element's CSS positioning container. Furthermore, the formatting properties may include the middle rectangle 210 that may represent the selected element's CSS margin, for example. Moreover, the formatting properties may include the inner-most rectangle 215 that, for example, may represent the selected element's CSS padding. The aforementioned visual formatting properties are exemplary and others may be used.

From stage 310, where computing device 100 provides visual formatting properties, exemplary method 300 may advance to stage 320 where visual formatting application 120 may cause computing device 100 to provide interactive handles configured to provide design view editing of the visual formatting properties. Clicking on any of the following interactive handles using any of input devices 112, for example, may toggle the interactive handles property on or off. The visual formatting properties may comprise an outer-most polygon (e.g. outer-most rectangle 205) corresponding to a container of a selected element, a middle polygon (e.g. lines 235) corresponding to a margin of the selected element, and an inner-most polygon (e.g. middle border 220) corresponding to a padding of the selected element. For example, as shown in FIG. 2, the aforementioned interactive handles may include outer lines 230, connecting the positioning container (outer-most rectangle 205) to the margin (middle rectangle 210), that may represent the top, right, bottom, and left CSS offsets, for example. In addition, outer lines 230 rendered length may directly correspond to the offset's length. Likewise, lines bordering the margin visualization 235 may also comprise resize handles for the margin-top, margin-right, margin-bottom, and margin-left CSS properties. A middle border 220 may select the element. Handles 225 on middle border 220 may resize the width and height CSS properties. The aforementioned interactive handles are exemplary and others may be used. Once computing device 100 provides interactive handles in stage 320, exemplary method 300 may then end at stage 330.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The present invention may be embodied as systems, methods, and/or computer program products. Accordingly, the present invention may be embodied in hardware and/or in software (including firmware, resident software, microcode, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method to providing editable visual formatting, the method comprising:
   providing visual formatting properties, the visual formatting properties comprising;
      an outer-most polygon corresponding to a container of a selected element,
      a middle polygon corresponding to a margin of the selected element, the middle polygon being placed completely within the outer-most polygon, and
      an inner-most polygon corresponding to a padding of the selected element, the inner-most polygon being placed completely within the middle polygon; and
   providing interactive handles configured to provide design view editing of the visual formatting properties, wherein interactive handles further comprises:
      positioning tools, wherein the positioning tools comprise a positioning container box that shows a positioning container of the selected element, and
      offset lines offset lines comprising outer lines connecting the position container to the margin and representing offsets.

2. The method of claim 1, wherein providing the visual formatting properties comprises providing the visual formatting properties comprising a line connecting a side of the container to a corresponding side of the margin.

3. The method of claim 1 wherein providing the visual formatting properties comprises providing the visual formatting properties comprising a line connecting a side of the container to a corresponding side of the margin, the length of the line directly corresponding to a length of an offset between the side of the container and the corresponding side of the margin.

4. The method of claim 1, wherein providing the interactive handles configured to provide design view editing of the visual formatting properties comprises providing the interactive handles configured to provide design view editing of the visual formatting properties configured to resizing the width and height of the visual formatting properties.

5. The method of claim 1, wherein providing the visual formatting properties comprises providing the visual formatting properties comprising cascading style sheets (CSS) visual formatting properties.

6. The method of claim 1, wherein providing the interactive handles comprises providing The interactive handles configured to toggle the design view editing of the visual formatting properties on and off based on a user input.

7. The method of claim 1, wherein at least one of the outer-most polygon, the middle polygon corresponding, and the inner-most polygon comprises a rectangle.

8. A system for providing editable visual formatting, the system comprising:
   a memory storage for maintaining a database; and
   a processing unit coupled to the memory storage, wherein the processing unit is operative to:
      provide visual formatting properties, the visual formatting properties comprising;

an outer-most polygon corresponding to a container of a selected element, a middle polygon corresponding to a margin of the selected element, the middle polygon being placed completely within the outer-most polygon, an inner-most polygon corresponding to a padding of the selected element, the inner-most polygon being placed completely within the middle polygon, and a line connecting the outer-most polygon to the middle polygon, the line having a length corresponding to an offset between the container and the margin; and provide interactive handles configured to provide design view editing of the visual formatting properties, wherein interactive handles further comprises:

positioning tools, wherein the positioning tools comprise a cascading style sheet (CSS) positioning container box that shows a positioning container of the selected element, and offset lines allowing design view toggling, the offset lines comprising out lines connecting the position container to the margin and representing CSS offsets.

9. The system of claim 8, wherein the processing unit being operative to provide the visual formatting properties comprises the processing unit being operative to provide the visual formatting properties composing a line connecting a side of the container to a corresponding side of the margin, the length of the line directly corresponding to a length of an offset between the side of the container and the corresponding side of the margin.

10. The system of claim 8, wherein the processing unit being operative to provide the interactive handles configured to provide design view editing of the visual formatting properties comprises the processing unit being operative to provide the interactive handles configured to provide design view editing of the visual formatting properties configured to resizing the width and height of the visual formatting properties.

11. The system of claim 8, wherein the processing unit being operative to provide the visual formatting properties comprises the processing unit being operative to provide the visual formatting properties comprising cascading style sheets (CSS) visual formatting properties.

12. The system of claim 8, wherein the processing unit being operative to provide the interactive handles comprises the processing Unit being operative to provide the interactive handles configured to toggle he design view editing of the visual formatting properties on and off based on a user input.

13. The system of claim 8, wherein at least one of the outer-most polygon, the middle polygon corresponding, and the inner-most polygon comprises a rectangle.

14. A computer-readable medium which stores a set of instructions which when executed performs a method for providing editable visual formatting, the method executed by the set of instructions comprising:

providing visual formatting properties, the visual formatting properties comprising;

an outer-most polygon corresponding to a container of a selected element, a middle polygon corresponding to a margin of the selected element, an innermost polygon corresponding to a padding of the selected element, and a line connecting the outer-most polygon to the middle polygon, the line having a length corresponding to an offset between the container and the margin; and providing interactive handles configured to provide design view editing of the visual formatting properties, wherein interactive handles further comprises:

positioning tools, wherein the positioning tools comprise a positioning container box that shows a positioning container of the selected element, and offset lines allowing design view toggling the offset lines comprising out lines connecting the position container to the margin and representing CSS offsets.

15. The computer-readable medium of claim 14, wherein providing the visual formatting properties comprises providing the visual formatting properties comprising a line connecting a side of the container to a corresponding side of the margin, the length of the line directly corresponding to a length of an offset between the side of the container and the corresponding side of the margin.

16. The computer-readable medium of claim 14, wherein providing the interactive handles configured to provide design view editing of the visual formatting properties comprises providing the interactive handles configured to provide design view editing of the visual formatting properties configured to resizing the width and height of the visual formatting properties.

17. The computer-readable medium of claim 14, wherein providing the visual formatting properties comprises providing the visual formatting properties comprising cascading style sheets (CSS) visual formatting properties.

18. The computer-readable medium of claim 14, wherein providing the interactive handles comprises providing the interactive handles configured to toggle the design view editing of the visual formatting properties on and off based on a user input.

19. The method of claim 1, further comprising displaying effects of a cascading style sheets (CSS) rule applied to the visual formatting properties.

20. The method of claim 1, further comprising displaying effects o a cascading style sheets (CSS) margin collapsing rule applied to the visual formatting properties.

* * * * *

UNITED STATES PATENT AND TRADEMARK OFFICE
CERTIFICATE OF CORRECTION

| | | |
|---|---|---|
| PATENT NO. | : 7,337,393 B2 | |
| APPLICATION NO. | : 11/222715 | |
| DATED | : February 26, 2008 | |
| INVENTOR(S) | : Daniel P. Chartier et al. | |

It is certified that error appears in the above-identified patent and that said Letters Patent is hereby corrected as shown below:

On the Title Page, Item (75), under "Inventors", line 4, after "Redmond, WA (US)" insert -- Hessan Tchaitchian, Seattle, WA (US) --.

In column 8, line 12, in Claim 1, delete "to" and insert -- for --, therefor.

In column 8, line 30, in Claim 1, delete "offset lines offset lines" and insert -- offset lines, the offset lines --, therefor.

In column 8, line 37, in Claim 3, after "claim 1" insert -- , --.

In column 8, line 55, in Claim 6, delete "The" and insert -- the --, therefor.

In column 9, line 28, in Claim 9, delete "composing" and insert -- comprising --, therefor.

In column 9, line 48, in Claim 12, delete "Unit" and insert -- unit --, therefor.

In column 9, line 49, in Claim 12, delete "he" and insert -- the --, therefor.

In column 10, line 9, in Claim 14, delete "innermost" and insert -- inner-most --, therefor.

In column 10, line 21, in Claim 14, after "toggling" insert -- , --.

In column 10, line 53, in Claim 20, delete "o" and insert -- of --, therefor.

Signed and Sealed this
Twenty-second Day of February, 2011

David J. Kappos
*Director of the United States Patent and Trademark Office*